United States Patent
Morita et al.

(10) Patent No.: US 8,972,107 B2
(45) Date of Patent: Mar. 3, 2015

(54) VEHICLE-MOUNTED COMMUNICATION DEVICE AND NAVIGATION DEVICE

(75) Inventors: Shigeki Morita, Tokyo (JP); Yuji Hamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/360,375

(22) PCT Filed: Feb. 24, 2012

(86) PCT No.: PCT/JP2012/001292
§ 371 (c)(1),
(2), (4) Date: May 23, 2014

(87) PCT Pub. No.: WO2013/124904
PCT Pub. Date: Aug. 29, 2013

(65) Prior Publication Data
US 2014/0288774 A1    Sep. 25, 2014

(51) Int. Cl.
*G06F 7/00* (2006.01)
*H04W 72/02* (2009.01)
(Continued)

(52) U.S. Cl.
CPC .............. *H04W 72/02* (2013.01); *G01C 21/26* (2013.01); *G08G 1/094* (2013.01); *G08G 1/096716* (2013.01); *G08G 1/096783* (2013.01); *G08G 1/163* (2013.01)
USPC ............. 701/36; 701/417; 701/420; 701/424; 701/428; 340/988; 340/995.1; 340/995.14; 340/995.15; 340/995.16; 342/357.31; 382/118

(58) Field of Classification Search
CPC ............. G08G 1/06; G08G 1/14; G08G 1/16; G01C 21/26; B60R 21/00
USPC .......... 701/36, 417, 420, 424, 428, 431, 532; 340/988, 995.1, 990, 995.14, 995.15, 340/995.16, 995.17, 995.18, 995.19, 340/995.24, 995.25, 995.26, 995.27, 340/995.28; 342/357.31; 382/118
See application file for complete search history.

(56) References Cited

U.S. PATENT DOCUMENTS 6,909,946 B1 *  6/2005  Kabel et al. ..................... 701/21
8,024,116 B2 *  9/2011  Terao .............................. 701/417
(Continued)

FOREIGN PATENT DOCUMENTS

JP    2004-120081 A    4/2004
JP    2004-246687 A    9/2004
(Continued)

*Primary Examiner* — McDieunel Marc
(74) *Attorney, Agent, or Firm* — Birch, Stewart, Kolasch & Birch, LLP (57) ABSTRACT

A vehicle-mounted communication device includes wireless units 3a and 3b that switch a frequency that performs wireless communication with antennas 2a and 2b between a frequency for wireless communication for ITS and a frequency for wireless LAN communication, a parking determination unit 6 that determines whether or not a vehicle is parked, a parking position storage unit 6a that stores as a parking position a position where it is determined that the vehicle is parked by the parking determination unit 6, and a wireless control unit 4 that controls the wireless units 3a and 3b to perform the wireless communication for ITS with the antennas 2a and 2b when the vehicle is running, and switch the wireless communication for ITS or the wireless LAN communication to be performed with the antennas 2a and 2b on the basis of the parking position stored in the parking position storage unit 6a when the vehicle is parked.

12 Claims, 5 Drawing Sheets

(51) Int. Cl.
  *G01C 21/26* (2006.01)
  *G08G 1/09* (2006.01)
  *G08G 1/0967* (2006.01)
  *G08G 1/16* (2006.01)

(56) References Cited

U.S. PATENT DOCUMENTS

| | | | | |
|---|---|---|---|---|
| 8,085,667 | B2* | 12/2011 | Yamaguchi et al. | 370/235 |
| 8,467,472 | B2* | 6/2013 | Li et al. | 375/295 |
| 8,817,727 | B2* | 8/2014 | Usui | 370/329 |
| 2002/0128774 | A1* | 9/2002 | Takezaki et al. | 701/211 |
| 2005/0216185 | A1* | 9/2005 | Takezaki et al. | 701/200 |
| 2008/0154497 | A1* | 6/2008 | Terao | 701/210 |
| 2012/0071192 | A1* | 3/2012 | Li et al. | 455/522 |
| 2012/0127947 | A1* | 5/2012 | Usui | 370/329 |
| 2012/0238222 | A1 | 9/2012 | Nakaoka et al. | |

FOREIGN PATENT DOCUMENTS

| | | |
|---|---|---|
| JP | 2005-309822 A | 11/2005 |
| JP | 2009-8612 A | 1/2009 |
| JP | 2011-91795 A | 5/2011 |
| JP | 2011-191946 A | 9/2011 |

* cited by examiner

| Number | State of Vehicle | Determination Condition | State of Wireless Communication |
|---|---|---|---|
| 1 | During Parking (Parking Lot at Home) | IG Key Off<br>Vehicle Speed = 0<br>Gear = Parking<br>GPS Position = Undetected (Power Source Off)<br>Timer = Zero (Countdown Ended) | Wireless Communication Off (Power Source Off) |
| 2 | During Parking, During Riding (Parking Lot at Home) | IG Key = On (Including Accessory On)<br>Vehicle Speed = 0<br>Gear = Parking<br>GPS Position = Position Coordinates at Home<br>Timer = Countdown Initial Value | Wireless LAN Communication |
| 3 | Running | IG Key = On (Including Accessory On)<br>Vehicle Speed > 0<br>Gear = Other than Parking<br>GPS Position = Not Prescribed<br>Timer = Countdown Initial Value | Wireless Communication for ITS |
| 4 | Stop (On Road, Signal Waiting, or the Like) | IG Key = On (Including Accessory On)<br>Vehicle Speed = 0<br>Gear = Other than Parking<br>GPS Position = Other than Position Coordinates at Home<br>Timer = Countdown Initial Value | Wireless Communication for ITS |
| 5 | During Parking (On Road) | IG Key = Off<br>Vehicle Speed = 0<br>Gear = Parking<br>GPS Position = Other than Position Coordinates at Home<br>Timer = Counting Down | Wireless Communication for ITS |
| 6 | During Parking (On Road) | IG Key = Off<br>Vehicle Speed = 0<br>Gear = Parking<br>GPS Position = Other than Position Coordinates at Home<br>Timer = Zero (Countdown Ended) | Wireless Communication Off (Power Source Off) |
| 7 | During Parking, During Riding (Parking Lot, Hot Spot) | IG Key = Off (Including Accessory On)<br>Vehicle Speed = 0<br>Gear = Parking<br>GPS Position = Other than Position Coordinates at Home<br>Timer = Countdown Initial Value | Switching to Wireless LAN Communication by Manual Operation.<br>When There Are 2 Channels, 1 Channel May Be Operated as Wireless Communication for ITS, and 1 Channel May Be Switched to Wireless LAN Communication. |

| Number | State of Vehicle | Determination Condition 1 | Determination Condition 2 | State of Wireless Communication |
|---|---|---|---|---|
| 1 | During Parking (Parking Lot at Home) | IG Key Off<br>Vehicle Speed = 0<br>Gear = Parking<br>GPS Position = Undetected (Power Source Off)<br>Timer = Zero (Countdown Ended) | Position = Undetected (Power Source Off)<br>Vehicle Sensor = Undetected (Power Source Off)<br>White Line Recognition = Undetected<br>(Power Source Off) | Wireless Communication Off (Power Source Off) |
| 2 | During Parking, During Riding (Parking Lot at Home) | IG Key = On (Including Accessory On)<br>Vehicle Speed = 0<br>Gear = Parking<br>GPS Position = Position Coordinates at Home<br>Timer = Countdown Initial Value | Position = Parking Lot at Home (Other than Road)<br>Vehicle Sensor = No Oncoming/<br>Following Vehicle Detected<br>White Line Recognition = No White Line<br>(Other than Road) | Wireless LAN Communication |
| 3 | Running | IG Key = On (Including Accessory On)<br>Vehicle Speed > 0<br>Gear – Other than Parking<br>GPS Position = Not Prescribed<br>Timer = Countdown Initial Value | Position = On Road<br>Vehicle Sensor = Oncoming/Following Vehicle<br>Intermittently Detected<br>White Line Recognition = White Line Recognized<br>(On Road) | Wireless Communication for ITS |
| 4 | Stop (On Road, Signal Waiting, or The Like) | IG Key = On (Including Accessory On)<br>Vehicle Speed = 0<br>Gear = Other than Parking<br>GPS Position – Other than Position<br>Coordinates at Home<br>Timer = Countdown Initial Value | Position = On Road<br>Vehicle Sensor = Oncoming/Following Vehicle<br>Intermittently Detected<br>White Line Recognition = White Line Recognized<br>(On Road) | Wireless Communication for ITS |
| 5 | During Parking (On Road) | IG Key = Off<br>Vehicle Speed = 0<br>Gear = Parking<br>GPS Position = Other than Position<br>Coordinates at Home<br>Timer = Counting Down | Position = On Road<br>Vehicle Sensor = Oncoming/Following Vehicle<br>Intermittently Detected<br>White Line Recognition = White Line Recognized<br>(On Road)<br>Determined as Parking/Stopping on Road | Wireless Communication for ITS |
| 6 | During Parking (On Road) | IG Key = Off<br>Vehicle Speed = 0<br>Gear = Parking<br>GPS Position = Other than Position<br>Coordinates at Home<br>Timer = Zero (Countdown Ended) | Position = Undetected (Power Source Off)<br>Vehicle Sensor = Undetected (Power Source Off)<br>White Line Recognition = Undetected<br>(Power Source Off) | Wireless Communication Off (Power Source Off) |
| 7 | During Parking, During Riding (Parking Lot, Hot Spot) | IG Key = Off (Including Accessory On)<br>Vehicle Speed = 0<br>Gear = Parking<br>GPS Position = Other than Position<br>Coordinates at Home<br>Timer = Countdown Initial Value | Position = Parking Lot (Other than Road)<br>Vehicle Sensor = No Oncoming/Following<br>Vehicle Detected<br>White Line Recognition = No White Line Recognized<br>(Other than Road) | When Within Parking Lot, Automaticlly Switched to Wireless LAN Communication. In Case of Parking on Road, When Manually Switched to Wireless LAN Communication, Warning Is Given and, If Possible, 1 Channel Is Operated as Wireless Communication for ITS. |

VEHICLE-MOUNTED COMMUNICATION DEVICE AND NAVIGATION DEVICE

TECHNICAL FIELD

The present invention relates to a vehicle-mounted communication device and a navigation device capable of performing wireless communication for vehicles that uses a frequency band dedicated to vehicles such as wireless communication for ITS (Intelligent Transport Systems) and general-purpose wireless communication such as wireless LAN (Local Area Network) communication.

BACKGROUND ART

As applications for ITS, for example, the following collision prevention system has been developed: when inter-vehicular (vehicle-to-vehicle) communication is performed, the position, speed, and the like of an own vehicle is transmitted, and the position, speed, and the like of any other vehicle is received to thus confirm a mutual positional relationship therebetween; when this positional relationship indicates the possibility of a collision between the mutual vehicles, the drivers are alerted.

In addition, the following signal oversight prevention system has been developed: when road-to-vehicle communication is performed, and when it is determined on the basis of the signal information received from a roadside communication system that the own vehicle, is not properly decelerated at a red light, the driver is alerted.

On the other hand, for example, in Patent Document 1, there is disclosed a wireless device that controls transmission of a packet signal storing therein information related to the driving state of an own vehicle depending on whether the vehicle is running or stopped. In the wireless device, if the on vehicle is running, the transmission of the foregoing packet signal is continued, and if the own vehicle is parked, the transmission of the foregoing packet signal is stopped assuming that safety support for the running vehicle is unnecessary. By doing so, the probability of a collision of the foregoing packet signal used for a safety support system is reduced.

PRIOR ART DOCUMENTS

Patent Documents

Patent Document 1: Japanese Patent Application Publication No. 2011-91795

SUMMARY OF THE INVENTION

Problems to be Solved by the Invention

In the aforementioned safety support system, a vehicle-mounted communication device exchanges information required for the safety support via wireless communication using a frequency band dedicated to vehicles. Here, such wireless communication is called wireless communication for ITS. In Europe and the United States, a wireless standard of the wireless communication for ITS using a 5.9 GHz band as the frequency band dedicated to vehicles is examined.

On the other hand, wireless LAN communication is generally widely prevalent as general-purpose wireless communication and uses frequencies in a 2.4 GHz band and in a 5 GHz band. As communication points for the wireless LAN communication, access points at ordinary homes and public communication connection points called hot spots are available.

The frequency band in the wireless communication for ITS is close to the frequency band used in the wireless LAN communication for the 5 GHZ band, and also a communication method for the wireless communication for ITS is similar to that for the wireless LAN communication; thus, the wireless communication for ITS and the wireless LAN communication can be easily switched and used in the same wireless communication system.

However, in such a wireless communication device, depending on whether or not the own vehicle is running, and a parking position (parking place) thereof, proper switching has to be performed between the wireless communication for ITS and the wireless LAN communication.

For example, when the own vehicle is running, it is necessary to exchange information to be used for the safety support by performing the wireless communication for ITS between vehicles and between a road and a vehicle. On the other hand, when the own vehicle, is parked in a safe place such as a parking lot, there is no problem even if switching is performed from the wireless communication for ITS to the wireless LAN communication. However, even when the own vehicle is parked, in a case where the parking place where the vehicle is parked is on a road (road side), if the wireless communication for ITS is stopped, the position information of the own vehicle cannot be transmitted to another vehicle running on the road, which falls into a state where a safety support system for preventing a rear-end collision or the like does not function properly.

As mentioned above, when the wireless communication for ITS and the wireless LAN communication are switched and used in the vehicle-mounted communication device, proper switching has to be performed between the two wireless communication depending on whether or not the own vehicle is running, and the parking position of the own vehicle parking place). For this reason, due to an improper stop of the wireless communication for ITS, information necessary for the safety support cannot be exchanged; thus, there is a possibility in which a service from the safety support system cannot be received. On the other hand, when the wireless LAN communication is used, a user has to think about in what kind of situation it is properly used on every occasion; thus, the convenience of the vehicle-mounted communication device capable of switching between the two wireless communications is impaired, and further a factor in which the use of the vehicle-mounted communication device is avoided is constituted, which poses a problem.

In the prior art represented by Patent Document 1, the transmission of a packet signal in which information related to the running state of the own vehicle is stored is controlled depending on whether the vehicle is running or stopped; however, since the switching between the wireless communication for ITS and the wireless LAN communication is not taken into consideration, it cannot be determined in what kind of situation the general-purpose wireless communication such as the wireless LAN communication should be used.

The present invention is made to solve the foregoing problems, and an object of the invention is to obtain a vehicle-mounted communication device and a navigation device that can use the wireless communication for vehicles using the frequency band dedicated to vehicles and the general-purpose wireless communication by switching properly between the two communications.

Means for Solving the Problem

A vehicle-mounted communication device according the present invention includes: an antenna that corresponds to wireless communication for a vehicle using a frequency band dedicated to the vehicle, and general-purpose wireless communication; a wireless unit that switches a frequency that performs the wireless communication with the antenna between a frequency for the wireless communication for the vehicle, and a frequency for the general-purpose wireless communication; a parking determination unit that determines whether or not the vehicle is parked; a storage unit that stores as a parking position a vehicle position at the time when it is determined that the vehicle is parked by the parking determination unit; and a wireless control unit that controls the wireless unit to perform the wireless communication for the vehicle with the antenna when the vehicle is running, and switch the wireless communication for the vehicle or the general-purpose wireless communication to be performed with the antenna according to the parking position stored in the storage unit when the vehicle is parked.

Effect of the Invention

According to the present invention, there is an advantageous effect that the device can use the frequency band dedicated to the vehicle and the general-purpose wireless communication by switching properly between the two communications.

BRIEF DESCRIPTION OF THE DRAWINGS

FIG. 2 is a view showing states of a vehicle according to Embodiment 1 and determination conditions for communication switching corresponding to this.

FIG. 5 is a view showing states of a vehicle according to Embodiment 2 and determination conditions for communication switching corresponding to this.

BEST MODE FOR CARRYING OUT THE INVENTION

In the following, in order to explain the present invention in more detail, embodiments for carrying out the invention will be described with reference to the accompanying drawings. Embodiment 1.

Figure 1:
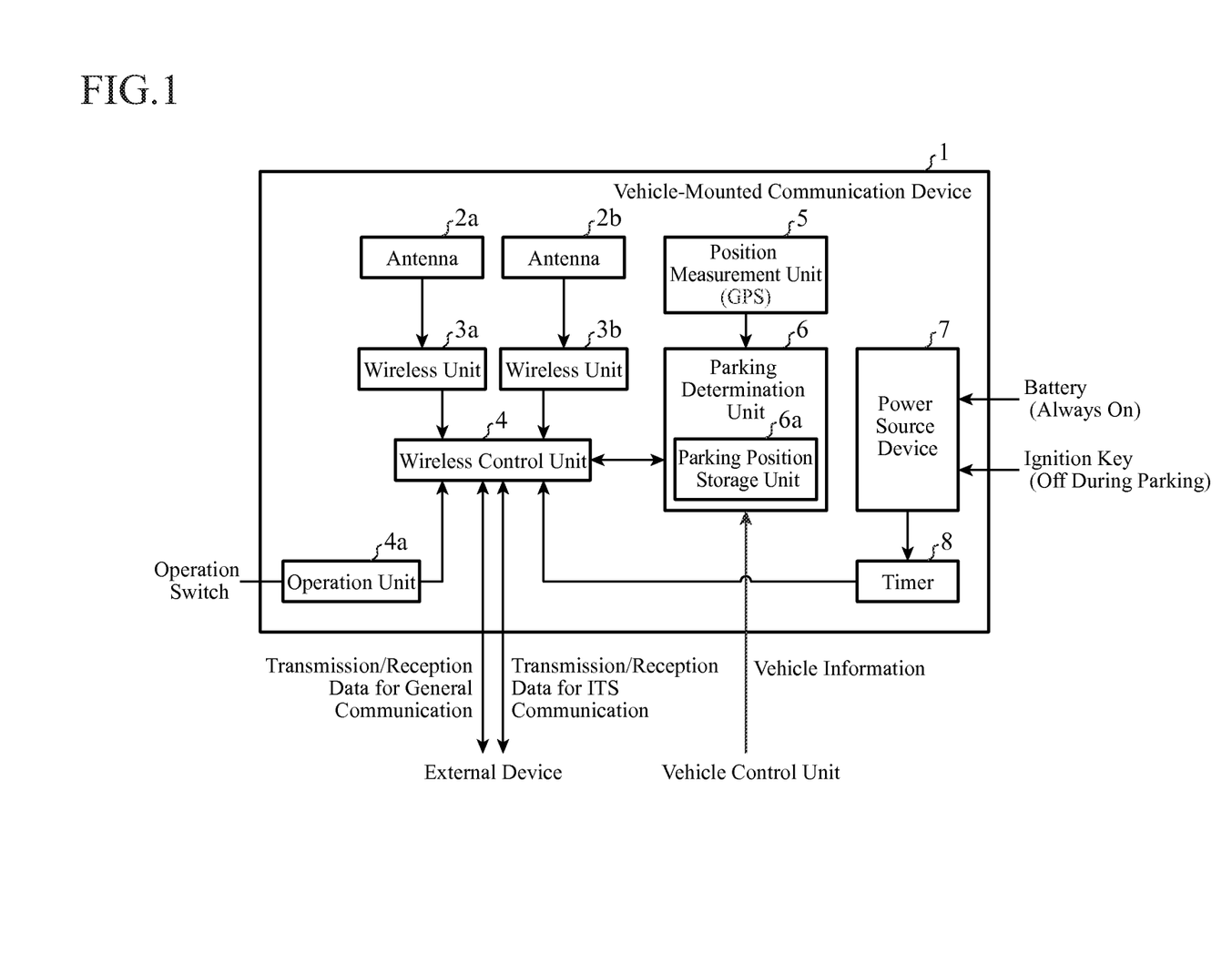
FIG. 1 is a block diagram showing a configuration of a vehicle-mounted communication device according to Embodiment 1 of the present invention.

FIG. 1 is a block diagram showing a configuration of a vehicle-mounted communication device according to Embodiment 1 of the present invention, and shows the vehicle-mounted communication device that has two wireless communication systems including an antenna 2a and a wireless unit 3a and an antenna 2b and a wireless unit 3b, and is capable of simultaneous communication of 2 channels.

A vehicle-mounted communication device 1 shown in FIG. 1 includes: the antennas 2a and 2b; the wireless units 3a and 3b; a wireless control unit 4; an operation unit 4a; a position measurement unit 5; a parking determination unit 6; a power source device 7; and a timer 8.

The antenna 2a is the antenna that can use wireless communication for ITS that is wireless communication for vehicles using a frequency band dedicated to vehicles, and wireless LAN communication that is general-purpose wireless communication at respective frequencies. The antenna 2b can also use the respective frequencies for both the wireless communications.

The wireless units 3a and 3b are RF units that include: transmission AMPs that amplify signals transmitted from the antennas 2a and 2b; reception AMPs that amplify signals received from the antennas 2a and 2b; mixers that mix the amplified signals with local oscillation frequency signals to generate intermediate frequency (IF) signals; filters that perform processing of limiting the hands of the IF signals generated by the mixers; and the like, respectively.

The wireless control unit 4 is the control unit that controls operations of the wireless units 3a and 3b, and corresponds to a wireless standard for the wireless communication for ITS and a wireless standard for the wireless LAN communication, and has a function of switching a frequency, a communication period, and a modulation method, and demodulating reception data.

Reception data for ITS communication and reception data for general communications (wireless LAN communication) are output from the wireless control unit 4 to an external device. Reversely, transmission data for ITS communication and transmission data for general communication (wireless LAN communication) are output from the external device to she wireless control unit 4.

Note that in FIG. 1, there is shown a case where the wireless control unit 4 has inputs/outputs for the 2 systems; however, it may also be configured to have physically one input/output using communications of Ethernet (registered trademark) or the like. Also, a connection thereof to the external device may be wired or wireless.

The operation unit 4a is connected to an operation switch, and notifies the wireless control unit 4 to switch to the wireless communication (wireless communication for ITS or wireless LAN communication) designated from the outside through the operation switch.

The position measurement unit 5 is the position measurement unit that measures a current position of an own vehicle, and for example analyzes a GPS wave received by a GPS (Global Positioning System) receiver from a. GPS satellite to measure positional information (latitude/longitude) of the own vehicle and a current time thereof.

The parking determination unit 6 determines whether or not the vehicle is parked. For example, the determination unit receives, as vehicle information, information such as a vehicle speed, a parking brake, or a gear position from a vehicle control unit of the vehicle, and determines whether the own vehicle is running or parked on the basis of the vehicle information. When determining that the own vehicle is parked, the parking determination unit 6 stores as a parking position the own vehicle position at the time when the measurement is performed by the position measurement unit 5 in a parking position storage unit 6a.

Note that since the information of the vehicle speed and the on vehicle position is also included in the data for ITS communication, the parking determination unit 6 may also perform the parking determination and the specification of the parking position using the data for ITS communication. In this case, unlike in FIG. 1, direct inputs of the position information measured by the position measurement unit 5 and the vehicle information from an external vehicle control unit to the parking determination unit 6 may also be omitted.

The parking position storage unit 6a is the storage unit that stores as the parking position the vehicle position at the time when it is determined that the own vehicle is parked by the parking determination unit 6.

The power source device 7 is connected to a battery terminal of the vehicle to be always energized even when an ignition key of the vehicle is turned OFF, and to an ignition (IG) terminal to be energized when the ignition key is turned ON or put at an accessory position to thus supply power to the internal configuration of the vehicle-mounted communication device 1. Note that even when the ignition key is put from the ON state to the OFF state, it is configured such that the power is supplied to the vehicle-mounted communication device 1 for a certain period of time.

The timer 8 is connected to the power source device 7; when the vehicle is running and the ignition key is ON, an initial value of a countdown is constantly set to the timer; the timer performs the countdown to clock a predetermined time from the time when the vehicle is parked and then the ignition key is turned OFF to the time until zero is reached. For only the predetermined time, the power source device 7 continues the supply of the power to the vehicle-mounted communication device 1. At this time, the timer 8 notifies the wireless control unit 4 that the current time is within the predetermined time from the time when the ignition key is put from the ON state to the OFF state.

As shown in FIG. 1, the vehicle-mounted communication device 1 has the two wireless communication systems including the antennas 2a and 2b and the wireless units 3a and 3b, and corresponds to a mode that performs communication of 2 channels of the wireless communication for ITS and the wireless LAN communication, or a mode that performs communication of each channel of the wireless communication for ITS and the wireless LAN communication. Of course, it is assumed that when only the one wireless communication system is provided, communication is performed by switching the system to either the wireless communication for ITS or the wireless LAN communication.

Next, a description will be given of an operation thereof.

FIG. 2 is a view showing states of the vehicle according to Embodiment 1 and determination conditions for communication switching corresponding to this. Details of the communication switching in the vehicle in each of the states will be described with reference to FIG. 2.

Note that each of the determination conditions for communication switching corresponding to the states of the vehicle shown in FIG. 2 is set to the wireless control unit 4. For example, the data shown in FIG. 2 is stored in a memory (not shown in FIG. 1) that can be read appropriately by the wireless control unit 4.

On the basis of the result of the parking determination by the parking determination unit 6, the parking position stored in the parking position storage unit 6a, and the content of the notification from the timer 3, the wireless control unit 4 determines the ON/OFF state of the ignition key, the vehicle speed, the gear position, the OPS position (vehicle position), and the count value in the timer 8, and discriminates the state of the vehicle and the determination condition corresponding to this from these pieces of information. Then, the wireless control unit 4 controls the wireless units 3a and 3b to switch to the wireless communication corresponding to the determined determination condition (see "State of Wireless Communication").

Note that "Number" shown in FIG. 2 is an identification number assigned to each of the determination conditions; the wireless control unit 4 reads the content of the determination condition from the above memory on the basis of the corresponding number, and discriminates the condition corresponding to the current state of the vehicle.

A state numbered with 1 is the following state: judging from the result of the parking determination by the parking determination unit 6 and the parking position stored in the parking position storage unit 6a, the vehicle is parked in a parking lot at home; because the IC key (ignition key) is turned OFF, the engine is not started; and there is no occupant such as driver in the vehicle. In this state, in order to prevent battery death of the vehicle, the power source of the vehicle-mounted communication device 1 is turned OFF to be not in communication ("State of Wireless Communication" is OFF in wireless communication).

A state numbered with 2 is the state in which the vehicle is parked in the parking lot at home, but the occupant such as driver is present in the vehicle to perform an operation for car navigation or the like. That is, in order to operate a vehicle-mounted device, the ignition key is turned ON and the engine is started, or the ignition key is put in an accessory position and the power source of the vehicle-mounted communication device 1 is turned ON.

In this state, the wireless control unit 4 controls the wireless units 3a and 3b, and switches to the wireless LAN communication to be performed with the antennas 2a and 2b. Note that in this case, it is assumed that the parking lot at home is the parking place specified in advance where the wireless LAN communication is possible. That is, in the parking lot at home, the vehicle-mounted communication device 1 is connected to a pre-set access point for the wireless LAN communication.

The wireless standard of the wireless LAN communication is based on an access point at home. When the access point can use two or more communication channels at the same time, the vehicle-mounted communication device 1 is also allowed to perform communication via a wireless LAN based on a high-speed connection standard using the two wireless units 3a and 3b in combination. For example, it is possible to connect the communication device to a personal computer at home, and download music and moving image files stored in this to the memory of a car navigation device capable of these reproductions at a high speed.

A state numbered with 3 is the state in which the vehicle is started from the state numbered with 2, and the vehicle speed is no longer zero. In this state, since the vehicle is in a running state, even when the ongoing wireless LAN communication during parking is in the middle, the wireless control unit immediately switches the wireless communication performed with the antennas 2a and 2b to the wireless communication for ITS ("State of Wireless Communication" is the wireless communication for ITS).

At this time, the vehicle-mounted communication device 1 performs inter-vehicular wireless communication of the information such as the position and speed of the own vehicle to a peripheral vehicle via the wireless communication for ITS, and also receives the information such as the position and speed from the peripheral vehicle by the inter-vehicular wireless communication via the wireless communication for ITS, and receives signal information and the like from a roadside communication device.

In a state numbered with 4, the vehicle speed is zero, for example, in a state where the vehicle is stopped at a red light; however, the gear position is a neutral or drive position other than a parking position, and the position of the vehicle is also other than the parking lot at home. Since this state corresponds to a state in which the vehicle is stopped on the road, the wireless control unit 4 causes the antennas 2a and 2b to continue the wireless communication for ITS.

A state numbered with 5 is the state immediately after the vehicle is parked on the road. In this state, the ignition key is turned OFF and the power source in the vehicle is also stopped. That is, the power source of the external device (communication source device outside the vehicle-mounted communication device 1) which gives the transmission data for ITS communication to the vehicle-mounted communication device 1 is also turned OFF, so that the transmission data for the wireless communication for ITS cannot be obtained.

On the other hand, since the timer 8 is during countdown, even when the ignition key is turned OFF, power is supplied by the power source device 7 from the battery of the vehicle to the vehicle-mounted communication device 1, and the wireless control unit 4 continues the wireless communication for ITS via the antennas 2a and 2b.

At this time, the wireless control unit 4 considers the parking position stored in the parking position storage unit 6a as the current vehicle position, and performs the wireless communication for ITS with the antennas 2a and 2b using the vehicle position and the current time clocked by the timer 8 as the transmission data.

That is, the control unit transmits the position parked by the own vehicle and the zero of the vehicle speed by the inter-vehicular communication via the wireless communication for ITS, and provides the information which allows the peripheral vehicle such as a following vehicle to determine whether or not there is the possibility of a rear-end collision. Note that in this case, in order to prevent consumption of the battery in the vehicle, the communication period of the wireless communication for ITS is lengthened to the extent of 0.1 to 10 seconds to be intermittently operated. In this manner, power consumption of the power source in which the supply is continued for a predetermined time from the time when the vehicle is parked can be reduced.

A state numbered with 6 is the state in which a time has further elapsed from the state numbered with 5. When the countdown by the timer 8 is ended, and the count value in the timer 8 becomes zero, in order to prevent the battery in the vehicle from dying, the power source device 7 automatically stops the power supply.

A state numbered with 7 shows the case where the vehicle performs wireless communication at a place (hot spot) where the wireless LAN communication is possible at, for example, a parking lot of a visiting destination. In addition, though it is closer to the state numbered with 2, a case in which the wireless LAN communication is performed in the state where the vehicle is parked on the road may also be considered; thus, switching to the wireless LAN communication is not performed automatically, but is performed by a manual operation using an operation switch.

Note that as shown in FIG. 1, when there are the two wireless communication systems (two channels), by performing the wireless LAN communication in one of the channels and performing the wireless communication for ITS in the other channel, the inter-vehicular communication on the road may also be continued.

Figure 3:
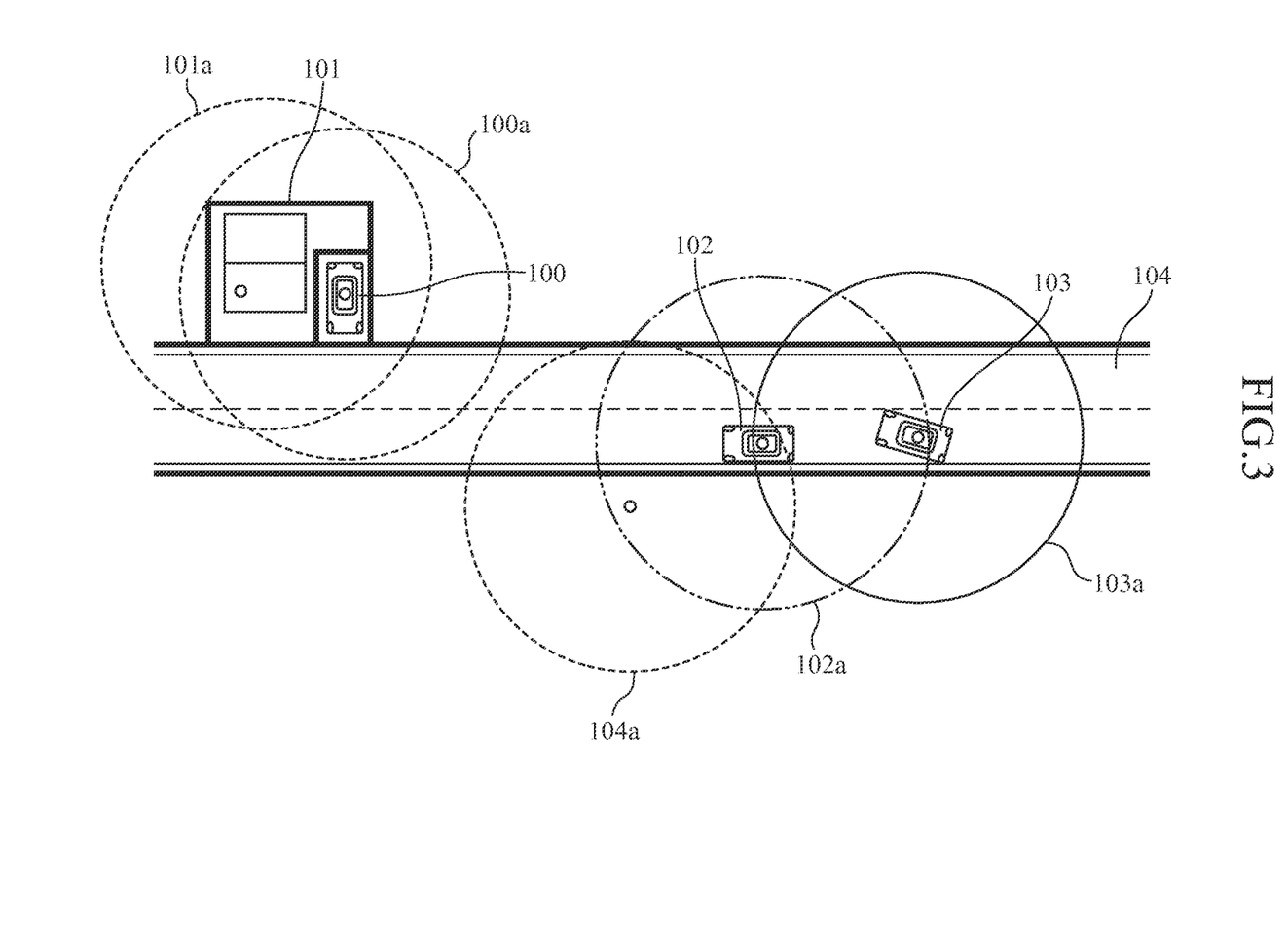
FIG. 3 is a view showing wireless communication areas for the vehicle in various states.

Next, a description will be given of parking places and wireless communication areas for a vehicle in the vehicle-mounted communication device 1 according to Embodiment 1. FIG. 3 is a view showing the wireless communication areas for the vehicle in various states.

The state of a vehicle 100 shown in FIG. 3 corresponds to the state in which the vehicle is stopped in the parking lot at home and which are numbered with 1 and 2 shown in FIG. 2. In the parking lot at a home 101, the possibility of a collision with another vehicle is low, and thus the vehicle-mounted communication device 1 need not exchange information by the wireless communication for ITS and may appropriately perform communication via the wireless LAN. In this case, there is an access point for the wireless LAN communication at the home 101; when the vehicle 100 is parked in the parking lot at the home 101, a wireless communication area 100a of the vehicle-mounted communication device 1 for the wireless LAN communication overlaps a wireless communication area 101a of the access point, which enables a communication connection. Accordingly, in a case where the access number of the access point for the wireless LAN communication at the home 101 and the position of the home 101 are registered in the vehicle-mounted communication device 1, at the time when the vehicle 100 is parked in the parking lot at the home 101, the vehicle-mounted communication device 1 switches automatically from the wireless communication for ITS to the wireless LAN communication.

In addition, the state of a vehicle 102 shown in FIG. 3 corresponds to the states numbered with 5, 6, and 7 shown in FIG. 2 when the vehicle is parked on the road. In the example of FIG. 3, the vehicle 102 is parked at a position where a communication area 102a of the vehicle-mounted communication device 1 mounted in the vehicle 102 for the wireless LAN communication or the wireless communication for ITS overlaps a communication area 104a for a public wireless LAN (hot spot), in other words, in a wireless communication area which enables a connection to the public wireless LAN. At this time, when the driver switches the vehicle-mounted communication device 1 to the wireless LAN communication using the operation switch, a connection to the Internet can be achieved.

However, since the vehicle 102 is parked on a road 104, when the wireless communication for ITS by the vehicle-mounted communication device 1 is stopped, information such as the vehicle position and the vehicle speed cannot be exchanged with the vehicle-mounted communication device 1 (in a wireless communication area 103a for the wireless communication for ITS) mounted in a following vehicle 103 by the wireless communication for ITS. In this case, there is a possibility in which a service such as collision prevention support is not received, resulting in a higher risk of an accident. Accordingly, when the vehicle is parked on the road 104, the wireless communication for ITS is preferably performed in one channel thereof.

As described above, according to Embodiment 1, the vehicle-mounted communication device includes: the antennas 2a and 2b corresponding to the wireless communication for ITS using the frequency band dedicated to vehicles and the wireless LAN communication; the wireless units 3a and 3b that switch the frequencies that perform the wireless communication with the antennas 2a and 2b between the frequency for the wireless communication for ITS and the frequency for the wireless LAN communication; the parking determination unit 6 that determines whether or not the vehicle is parked; the parking position storage unit 6a that stores as the parking position the vehicle position at the time when it is determined that the vehicle is parked by the parking determination unit 6; and the wireless control unit 4 that controls the wireless units 3a and 3b to perform the wireless communication for ITS with the antennas 2a and 2b when the vehicle is running, and switch to the wireless communication for ITS or the wireless LAN communication to be performed with the antennas 2a and 2b according to the parking position stored in the parking position storage unit 6a when the vehicle is parked. With such a configuration, the device can be used by switching properly between the wireless communication for ITS and the wireless LAN communication. Thus, in stopping or parking the vehicle on the road, no wireless communication for ITS is stopped accidentally, and a system for preventing a collision such as a rear-end collision using the inter-vehicular communication works effectively, thereby reducing occurrence probability of accidents.

In addition, according to Embodiment 1, the vehicle-mounted communication device includes a plurality of pairs of antennas and wireless units, such as the pair of the antenna 2a and the wireless unit 3a and the pair of the antenna 2b and the wireless unit 3b; even though the vehicle is parked, when the wireless LAN communication is possible and the vehicle is parked on the road, the wireless control unit 4 controls each of the wireless units 3a and 3b to simultaneously perform the wireless communication for ITS and the wireless LAN communication with the antennas 2a and 2b; therefore, it is possible to perform communication via the wireless LAN while enjoying a safety support service using the wireless communication for ITS, thereby achieving the improvement of the convenience of the vehicle-mounted communication device 1.

Further, according to Embodiment 1, the vehicle-mounted communication device 1 includes the timer 8 that clocks an elapsed time from the time when the vehicle is parked, and the wireless control unit 4 performs the wireless communication for ITS with the antennas 2a and 2b at a predetermined period until the elapsed time clocked by the timer 8 reaches a predetermined time; thus, power consumption of the power source in which the supply is continued for a predetermined time from the time when the vehicle is parked can be reduced.

Furthermore, according to Embodiment 1, when the power source of the device of the communication source outside the communication device 1 is turned OFF, and thus the transmission data for the wireless communication for ITS cannot be obtained from the corresponding device, the wireless control unit 4 considers the parking position stored in the parking position storage unit 6a as the current vehicle position, and performs the wireless communication for ITS with the antennas 2a and 2b using the vehicle position and the current time clocked by the timer 8 as the transmission data; therefore, even when the power source in the vehicle is turned OFF due to the parking and the operation of the communication source device, is stopped, data exchange by the wireless communication for ITS can be continued.

Embodiment 2.

Figure 4:
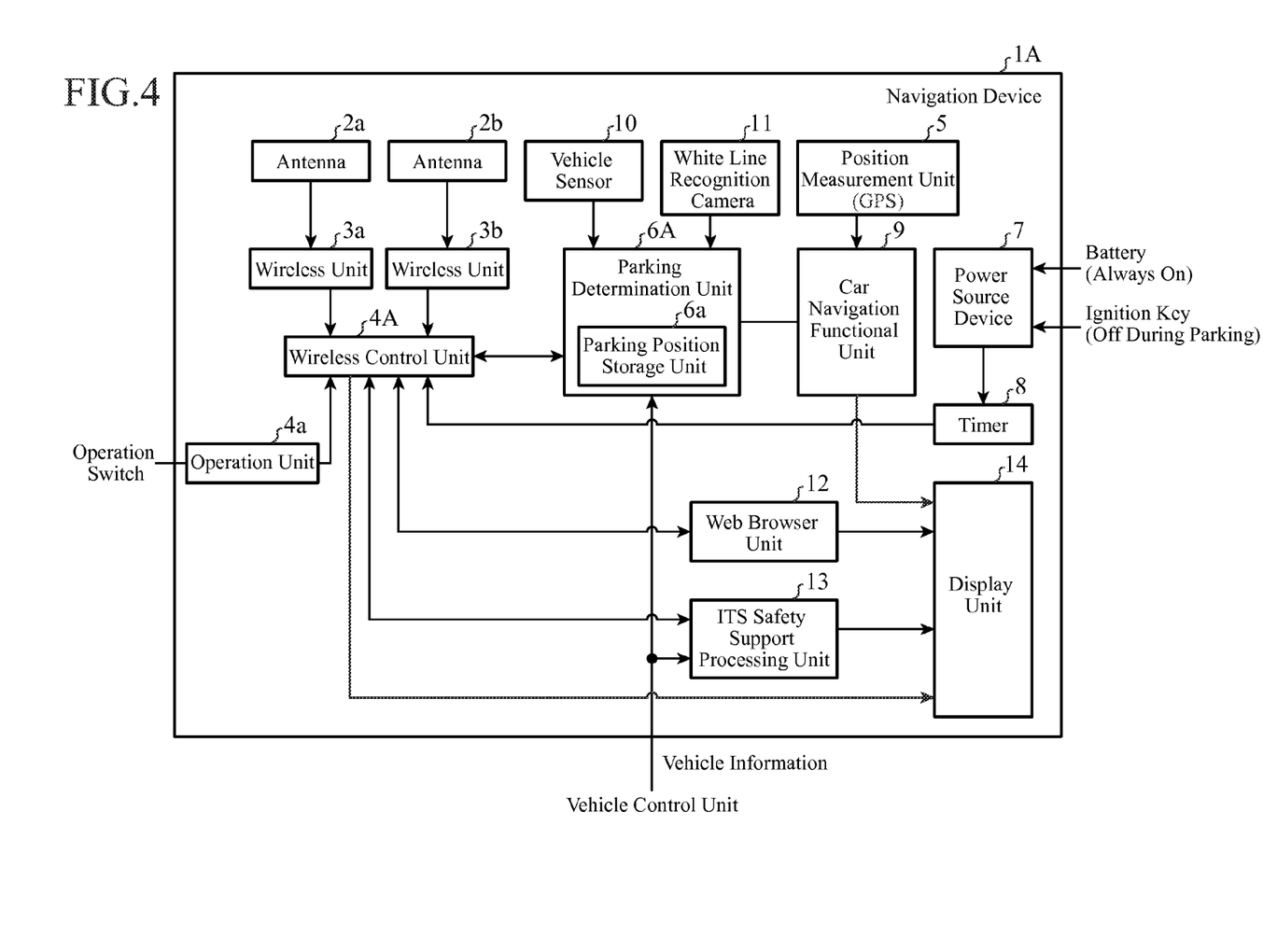
FIG. 4 is a block diagram showing a configuration of a navigation device according to Embodiment 2 of the invention.

FIG. 4 is a block diagram showing a configuration of a navigation device according to Embodiment 2 of the present invention, and similarly to the above Embodiment 1, shows the vehicle-mounted navigation device that has two wireless communication systems including an antenna 2a and a wireless unit 3a and an antenna 2h and a wireless unit 3b, and is capable of simultaneous communication of 2 channels.

A navigation device 1A shown in FIG. 4 includes: the antennas 2a and 2b; the wireless units 3a and 3b; a wireless control unit 4A; an operation unit 4a; a position measurement unit 5; a parking determination unit 6A; a power source device 7; a timer a; a car navigation functional unit 5; a vehicle sensor 10; a white line recognition camera 11; a Web browser unit 12; an ITS safety support processing unit 13; and a display unit 14.

The antenna 2a is the antenna that can use wireless communication for ITS that is wireless communication for vehicles using a frequency band dedicated to vehicles, and wireless LAN communication that is general-purpose wireless communication at respective frequencies. The antenna 2b can also use the respective frequencies for both the wireless communications.

The wireless units 3a and 3b are RF units that include: transmission AMPs that amplify signals transmitted from the antennas 2a and 2b; reception AMPs that amplify signals received from the antennas 2a and 2b; mixers that mix the amplified signals with local oscillation frequency signals to generate intermediate frequency (IF) signals; filters that perform processing of limiting the bands of the IF signals generated by the mixers; and the like, respectively.

The wireless control unit 4A is the control unit that controls operations of the wireless units 3a and 3b, and corresponds to a wireless standard for the wireless communication for ITS and a wireless standard for the wireless LAN communication, and has a function of switching a frequency, a communication period, and a modulation method, and demodulating reception data.

Similarly to the above Embodiment 1, reception data for ITS communication and reception data for general communication (wireless LAN communication) are output from the wireless control unit 4A to an external device (not shown in FIG. 4).

Reversely, transmission data for ITS communication and transmission data for general communication (wireless LAN communication) are output from the external device to the wireless control unit 4.

Note that in FIG. 4, there is shown a case where the wireless control unit 4A has inputs/outputs for the 2 systems; however, the wireless control unit 4A may also be configured to have physically one input/output using communications of Ethernet (registered trade mark) or the like. Also, a connection thereof to the external device may be wired or wireless.

The car navigation functional unit 9 is a navigation functional unit that performs navigation processing such as map display, route retrieval, or route guide on the basis of the own vehicle position measured by the position measurement unit 5 and map data.

Note that the car navigation functional unit 9 collates the parking position of the own vehicle stored in the parking position storage unit 6a with the map data to thus discriminate whether the own vehicle is parked on a road, in a parking lot at home, or in another parking lot, and outputs the discrimination result to the parking determination unit 6A.

The vehicle sensor 10 is the sensor that detects a running vehicle, outside the own vehicle. A system for detecting a vehicle such as a millimeter wave laser, a laser radar, or a camera is not particularly limited. Note that the vehicle sensor 10 detects the positions of a vehicle ahead of the own vehicle (oncoming vehicle) and a vehicle behind the own vehicle (following vehicle) and the vehicle speeds thereof. Information on the detection results is output from the vehicle sensor 10 to the parking determination unit 6A.

The white line recognition camera 11 is a photographing unit that performs image recognition of a white line on the road from an image obtained by photographing a scene outside the vehicle. For example, the recognition camera analyzes an image obtained by photographing the front or rear road of the own vehicle and performs image recognition of the information showing presence or absence of a white line and the position of the white line. This recognition result is output from the white line recognition camera 11 to the parking determination unit 6A. Note that also in the parking lot, a white line for parking guide exists, but is not continuous unlike the white line on the road; thus, by determining whether or not the recognized white line has a length exceeding a predetermined length, the white line recognition camera 11 can detect the white line for parking guide in distinction from the white line on the road.

The parking determination unit 6A determines whether or not the vehicle is parked. For example, the determination unit receives, as vehicle information, information such as a vehicle speed, a parking brake, or a gear position from the vehicle control unit of the vehicle, and determines whether the own vehicle is running or parked on the basis of the corresponding vehicle information.

Note that since the information of the vehicle speed and the own vehicle position is also included in the data for ITS communication, the parking determination unit 6A may also perform the parking determination and the specification of the parking position using the data for ITS communication. In this case, unlike in FIG. 4, direct inputs of the position information measured by the position measurement unit 5 and the vehicle information from an external vehicle control unit to the parking determination unit 6A may be omitted.

In addition, the parking determination unit 6A determines the parking place of the vehicle. In the example of FIG. 4, on the basis of the discrimination result by the car navigation functional unit 9, the detection result of a peripheral vehicle by the vehicle sensor 10, and the recognition result of the white line by the white line recognition camera 11, the parking determination unit 6A determines whether the vehicle is parked on the road or parked in a parking place specified in advance where the wireless LAN communication is possible.

Note that the determination of the parking place may be performed on the basis of at least one of the discrimination result by the car navigation functional unit 9, the detection result of the peripheral vehicle by the vehicle sensor 10, and the recognition result of the white line by the white line recognition camera 11. For example, when the parking place is determined from only the determination result by the car navigation functional unit 9, the vehicle sensor 10 and white line recognition camera 11 may be omitted.

Meanwhile, when the car navigation functional unit 9 does not perform the discrimination, and the vehicle sensor 10 or white line recognition camera 11 is used for the determination of the parking place, a configuration including only one of the sensor and camera to be used may be used.

Further, if the information showing the parking place can be acquired separately, the parking place may be determined by a method other than the discrimination result by the car navigation functional unit 9, the detection result of the peripheral vehicle by the vehicle sensor 10, and the recognition result of the white line by the white line recognition camera 11.

The Web browser unit 12 is configured to have a function of performing Internet browsing when communication is being performed via the wireless LAN communication, and displays a home page on the Internet or the like on the display unit 14.

The ITS safety support processing unit 13 determines whether or not it is necessary to alert the driver from the positional relationship with the peripheral vehicle, signal information, or the like when the wireless communication for ITS is being performed; when alerting the driver, alert information is displayed on the display unit 14.

The display unit 14 is a display device that displays the processing result by the navigation device 1A, and is implemented by a liquid crystal display or the like. For example, the display unit 14 displays the alert information for alerting the driver. Additionally, when the vehicle is parked on the road, if an operation of switching to the wireless LAN communication is performed using an operation switch, warning information is displayed on the display unit 14. Note that the warning information is not only displayed on the screen of the display unit 14, but also may be presented with voice using a speaker not shown in FIG. 4.

The power source device 7 is connected to a battery terminal of the vehicle to be always energized even when the ignition key of the vehicle is turned. OFF, and to an ignition (IG) terminal to be energized when the ignition key is turned ON or put at an accessory position to thus supply power to the internal configuration of the navigation device 1A. Note that even when the ignition key is put from the ON state to the OFF state, it is configured such that the power is supplied to the navigation device 1A for a certain period of time.

The timer 8 is connected to the power source device 7; when the vehicle is running and the ignition key is ON, the initial value of a countdown is constantly set to the timer; the timer performs the countdown to clock a predetermined time from the time when the vehicle is parked and then the ignition key is turned OFF to the time until zero is reached. For only the predetermined time, the power source device 7 continues the supply of the power to the navigation device 1A. At this time, the timer 8 notifies the wireless control unit 4 that the current time is within the predetermined time from the time when the ignition key is put from the ON state to the OFF state.

As shown in FIG. 4, the navigation device 1A has the two wireless communication systems including the antennas 2a and 2b and the wireless units 3a and 3b, and corresponds to a mode that performs communication of 2 channels of the wireless communication for ITS and the wireless LAN communication, or a mode that performs communication of each channel of the wireless communication for ITS and the wireless LAN communication. Of course, it is assumed that when only the wireless communication system is provided, communication is performed by switching the system to either the wireless communication for ITS or the wireless LAN communication.

Next, a description will be given of an operation thereof.

FIG. 5 is a view showing states of the vehicle according to Embodiment 2 and determination conditions for communication switching corresponding to this. Details of the communication switching in the vehicle in each of the states will be described with reference to FIG. 5.

Note that each of the determination conditions for communication switching corresponding to the states of the vehicle shown in FIG. 5 is set to the wireless control unit 4A. For example, the data shown in FIG. 5 is stored in a memory (not shown in FIG. 4) that can be read appropriately by the wireless control unit 4A.

Similarly to the above Embodiment 1, on the basis of the result of the parking determination by the parking determination unit 6A, the parking position stored in the parking position storage unit 6a, and the content of the notification from the timer 8, the wireless control unit 4A determines the ON/OFF state of the ignition key, the vehicle speed, the gear position, the GPS position (vehicle position), and the count value in the timer 8, and discriminates the state of the vehicle and the determination condition corresponding to this from these pieces of information. Here, the determination condition 1 is the same as that of FIG. 2.

On the other hand, in the parking determination result by the parking determination unit 6A, the determination condition 2 is the condition related to the discrimination result by the car navigation functional unit 9, the detection result of the peripheral vehicle by the vehicle sensor 10, and the recognition result of the white line by the white line recognition camera 11.

The wireless control unit 4A controls the wireless units 3a and 3b to switch to the wireless communication corresponding to the discriminated determination conditions 1 and 2 (see "State of Wireless Communication").

Note that "Number" shown in FIG. 5 is an identification number assigned to each of the determination conditions 1 and 2, and the wireless control unit 4A reads the content of the determination condition from the above memory on the basis of the corresponding number, and discriminates the condition corresponding to the current state of the vehicle.

A state numbered with 1 is the following state: the vehicle is parked in the parking lot at home; because the IC key (ignition key) is turned. OFF, the engine is not started; and there is no occupant such as driver in the vehicle. In this state, in order to prevent battery death of the vehicle, the power source of each of the navigation device 1A, the vehicle sensor 10, and the white line recognition camera 11 is turned OFF to be not in communication ("State of Wireless Communication" is OFF in wireless communication).

A state numbered with 2 is the state in which the vehicle is parked in the parking of at home, but the occupant such as driver is present in the vehicle to perform an operation for car navigation or the like. That is, in order to operate a vehicle-mounted device, the ignition key is turned ON and the engine is started, or the ignition key is put in the accessory position and the power source of the navigation device 1 is turned ON.

At this time, the determination result of the parking place by the car navigation functional unit 9 is also the parking lot at home; no vehicle sensor 10 detects an oncoming vehicle or a following vehicle, and no white line recognition camera 11 recognizes the white line. Accordingly, the parking determination unit 6A determines that the parking place is the parking lot at home.

In this state, the wireless control unit 4A controls the wireless units 3a and 3b, and switches to the wireless LAN communication to be performed with the antennas 2a and 2b. Note that in this case, it is assumed that the parking lot at home is the parking place specified in advance where the wireless LAN communication is possible. That is, in the parking lot at home, the navigation device 1A is connected to a pre-set access point for the wireless LAN communication.

The wireless standard of the wireless LAN communication is based on an access point at home. When the access point can use two or more communication channels at the same time, the navigation device 1A is also allowed to perform communication via a wireless LAN based on a high-speed connection standard using the two wireless units 3a and 3b in combination. For example, it is possible to connect the vehicle-mounted communication device 1 to a personal computer at home, and download music and moving image files stored therein to the memory of a navigation device 1A capable of these, reproductions at a high speed.

A state numbered with 3 is the state in which the vehicle is started from the state numbered with 2, and the vehicle speed is no longer zero. It is discriminated by the car navigation functional unit 9 that the parking place is on the road, the vehicle sensor 10 detects intermittently the oncoming vehicle or the following vehicle, and the white line recognition camera 11 recognizes the white line. Accordingly, the parking determination unit 6A determines that the parking place is on the road.

In this state, since the vehicle is in a running state, even though the wireless LAN communication that is being performed during parking is in the middle, the wireless control unit 4A immediately switches the wireless communication performed with the antennas 2a and 2b to the wireless communication for ITS ("State of Wireless Communication" is wireless communication for ITS).

At this time, the navigation device 1A performs inter-vehicular wireless communication of the information such as the position and speed of the own vehicle to the peripheral vehicle via the wireless communication for ITS, and also receives the information such as the position and speed from the peripheral vehicle by the inter-vehicular wireless communication via the wireless communication for ITS, and receives signal information and the like from a roadside communication device.

As mentioned above, even when the wireless LAN communication is in the middle, the switching to the wireless communication for ITS is performed, and it is thus possible to receive precisely an ITS safety support service.

In a state numbered with 4, the vehicle speed is zero, for example, in a state where the vehicle is stopped at a red light; however, the gear position is a neutral or drive position other than a parking position. Under the determination condition 2, it is discriminated by the car navigation functional unit 9 that the parking place of the vehicle is on the road; the vehicle sensor 10 detects intermittently the oncoming vehicle or the following vehicle, and the white line recognition camera 11 recognizes the white line.

Accordingly, the parking determination unit 6A determines that the parking place of the vehicle is on the road. Since this state corresponds to the state where the vehicle is stopped on the road, the wireless control unit 4A causes the antennas 2a and 2b to continue the wireless communication for ITS.

A state numbered with 5 is the state immediately after the vehicle is parked on the road. In this state, until just before the ignition key is turned OFF, it is discriminated by the car navigation functional unit 9 that the parking place of the vehicle is on the road; the vehicle sensor 10 detects intermittently the oncoming vehicle or the following vehicle, and the white line recognition camera 11 recognizes the white line. Accordingly, the parking determination unit 6A determines that the parking place of the vehicle is on the road, and before the ignition key is turned OFF, it is stored in the parking position storage unit 6a that the parking place is on the road.

When the ignition key is turned OFF, the power source in the vehicle is stopped. That is, the power source of an external device (communication source device outside the navigation device 1A) which gives transmission data for ITS communication to the navigation device 1A is also turned OFF, so that the transmission data for the wireless communication for ITS cannot be obtained.

On the other hand, since the timer 8 is during countdown, even when the ignition key is turned OFF, power is supplied by the power source device 7 from the battery of the vehicle to the navigation device 1A, and the wireless control unit 4A continues the wireless communication for ITS via the antennas 2a and 2b.

At this time, the wireless control unit 4A performs the wireless communication for ITS with the antennas 2a and 2b using the vehicle position stored in the parking position storage unit 6a and the current time clocked by the timer 3 as the transmission data.

That is, the control unit transmits the position parked by the own vehicle and the zero of the vehicle, speed by the inter-vehicular communication via the wireless communication for ITS, and provides the information which allows the peripheral vehicle such as the following vehicle to determine whether or not there is the possibility of a rear-end collision. Note that in this case, in order to prevent consumption of the battery in the vehicle, the communication period of the wireless communication for ITS is lengthened to the extent of 0.1 to 10 seconds to be intermittently operated. In this manner, power consumption of the power source in which the supply is continued for a predetermined time from the time when the vehicle is parked can be reduced.

A state numbered with 6 is the state in which a time has further elapsed from the state numbered with 5. When the countdown by the timer 8 is ended, and the count value in the timer 8 becomes zero; then, in order to prevent the battery in the vehicle from dying, the power source device 7 automatically stops the power supply. That is, the power source of each of the navigation device 1A, the vehicle sensor 10, and the white line recognition camera 11 is also turned OFF.

A state numbered with 7 shows the case where the vehicle performs wireless communication at a place (hot spot) where the wireless LAN communication is possible at, for example, a parking place of a visiting place. Under the determination condition 2, in a case where the parking place is discriminated other than the road by the car navigation functional unit 9, no vehicle sensor 10 detects an oncoming vehicle or the following vehicle, and no white line recognition camera 11 recognizes the white line. Accordingly, the parking determination unit 6A determines that the parking place of the vehicle is a parking lot other than the parking lot (parking lot at home) specified in advance.

This state is close to the state numbered with 2; however, a case such that the wireless LAN communication is performed in the state where the vehicle is parked on the road may also be considered, and thus switching to the wireless LAN communication is not performed automatically, but is performed by a manual operation using an operation switch.

Note that as shown in FIG. 4, when there are the two wireless communication systems (two channels), by performing the wireless LAN communication in one of the channels and performing the wireless communication for ITS in the other channel, the inter-vehicular communication on the road may also be continued. Additionally, in a case where the parking place is discriminated as the parking lot by the car navigation functional unit 9, when no vehicle sensor 10 detects the oncoming vehicle or the following vehicle, and no white line recognition camera 11 recognizes the white line, the wireless control unit 4A may control the wireless units 3a and 3b to switch automatically to the wireless LAN communication.

In a case where the parking place is discriminated as being on the road by the car navigation functional unit 9, when the vehicle sensor 10 detects the oncoming vehicle or the following vehicle, and the white line recognition camera 11 recognizes the white line, the parking determination unit 6A determines that the parking place of the vehicle is on the road.

At this time, when the switching to the wireless LAN communication is manually performed using the operation switch, that is, when an instruction to switch to the wireless LAN communication is given from the operation unit 4a, the wireless control unit 4A causes the display unit 14 to display warning information showing that if the wireless communication for ITS required for safety support processing is stopped, the safety of the vehicle is affected. After the warning information is presented, when the occupant performs a communication switching operation, the switching to the wireless LAN communication is performed in response to this. In this manner, a situation in which the occupant cannot receive the safety support service accidentally can be prevented.

As described above, according to Embodiment 2, the navigation device includes: the antennas 2a and 2b corresponding to the wireless communication for ITS and the wireless LAN communication; the wireless units 3a and 3b that switch the frequencies that perform the wireless communication with the antennas 2a and 2b between the frequency for the wireless communication for ITS and the frequency for the wireless LAN communication; the parking determination unit 6A that determines whether or not the vehicle is parked, and the parking place; the parking position storage unit 6a that stores as the parking position the vehicle position at the time when it is determined that the vehicle is parked by the parking determination unit 6A; the position measurement unit 5 that measures the vehicle position; the car navigation functional unit 9 that performs she navigation processing on the basis of the own vehicle, position measured by the position measurement unit 5 and the map data; and the wireless control unit 4A that controls the wireless units 3a and 3b to perform the wireless communication for ITS with the antennas 2a and 2b when the vehicle is running, and continue the wireless communication for ITS with the antennas 2a and 2b when it is determined that the vehicle is parked on the road by the parking determination unit 6A, and switch to the wireless LAN communication when it is determined by the parking determination unit 6A that the vehicle is parked in the parking lot specified in advance where the wireless LAN communication is possible.

With such a configuration, it is possible to provide the navigation device that can be used by switching properly the wireless communication for ITS and the wireless LAN communication. In such a way, in stopping or parking the vehicle on the road, no wireless communication for ITS is stopped accidentally, and a system for preventing a collision such as a rear-end collision using the inter-vehicular communication works effectively, thereby reducing occurrence probability of accidents.

In addition, according to Embodiment 2, the car navigation functional unit 9 collates the parking position stored in the parking position storage unit 6a with the map data to thus discriminate the parking place of the vehicle, and the parking determination unit 6A determines, from the discrimination result by the car navigation functional unit 9, whether the vehicle is parked on the road or in the parking lot specified in advance where the wireless LAN communication is possible, thereby determine precisely the parking place of the vehicle.

Further, according to Embodiment 2, the navigation device further includes the white line recognition camera 11 that performs image recognition of the white line on the road from the image obtained by photographing the scene outside the vehicle; when the image recognition of the white line on the road is performed by the white line recognition camera 11, the parking determination unit 6A determines that the vehicle is parked on the road, thereby determine precisely the parking place of the vehicle.

Further, according to Embodiment 2, the navigation device further includes the vehicle sensor 10 that detects the vehicle running outside the own vehicle; when the running vehicle on the road is detected by the vehicle sensor 10, the parking determination unit 6A determines that the vehicle is parked on the road, thereby determine precisely the parking place of the vehicle.

Furthermore, according to Embodiment 2, the navigation device further includes a presentation unit such as the display device 14 that presents information to the occupant of the vehicle, and the operation unit 4a that gives the wireless control unit 4A an instruction to switch to the wireless communication for ITS or the wireless LAN to be performed with the antennas 2a and 2b; when it is determined by the car navigation functional unit 9 that the vehicle is parked on the road, if an instruction to switch to the wireless LAN communication is given from the operation unit 4a, the wireless control unit 4A causes the display unit 14 to display warning information to the occupant. In this manner, a situation in which the occupant cannot receive, the safety support service accidentally can be prevented.

Moreover, according to Embodiment 2, even though the wireless LAN communication with the antennas 2a and 2b is in the middle, when the running of the vehicle is started, the wireless control unit 4A switches to the wireless communication for ITS, thereby receiving precisely the ITS safety support service.

In the above Embodiment 2, there is described the case where the navigation device 1A according to the invention is applied to the vehicle-mounted navigation device; however, the device may be applied not only to the vehicle-mounted navigation device, but also to a mobile phone terminal or a mobile information terminal (PDA; Personal Digital Assistance). In addition, the device 1A may be applied to a PND (Portable Navigation Device) carried by a person and brought into a transportation such as a vehicle, a train, a ship, or an aircraft to be used therein or the like.

It is noted that in the present invention, it is possible to freely combine the embodiments, modify any component of the embodiments, or omit any component in the embodiments within the scope of the invention.

INDUSTRIAL APPLICABILITY

According to the vehicle-mounted communication device according to the present invention, since the wireless communication for vehicles using the frequency band dedicated to vehicles and the general-purpose wireless communication can be used by switching properly these communications, it is suitable for a communication device in a vehicle-mounted device having an ITS safety support function.

EXPLANATION OF REFERENCE NUMERALS

1 Vehicle-Mounted Communication device
1A Navigation Device
2a, 2b Antenna
3a, 3b Wireless Unit
4, 4A Wireless Control Unit
4a Operation Unit
5 Position Measurement Unit
6, 6A Parking Determination Unit
6a Parking Position Storage Unit
7 Power Source Device
8 Timer
9 Car Navigation Functional Unit
10 Vehicle Sensor
11 White Line Recognition Camera
12 Web Browser Unit
13 ITS Safety Support Processing Unit
14 Display Unit
100, 102, 103 Vehicle
101 Home
100a, 101a, 102a, 103a, 104a Wireless communication area
104 Road.

The invention claimed is:

1. A vehicle-mounted communication device comprising:
an antenna that corresponds to wireless communication for a vehicle using a frequency band dedicated to the vehicle, and general-purpose wireless communication;
a wireless unit that switches between a frequency that performs the wireless communication with the antenna between a frequency for the wireless communication for the vehicle, and a frequency for the general-purpose wireless communication;
a parking determination unit that determines whether or not the vehicle is parked;
a storage unit that stores as a parking position a vehicle position at the time when it is determined that the vehicle is parked by the parking determination unit; and
a wireless control unit that controls the wireless unit to perform the wireless communication for the vehicle with the antenna when the vehicle is running, and switch the wireless communication for the vehicle or the general-purpose wireless communication to be performed with the antenna according to the parking position stored in the storage unit when the vehicle is parked.

2. The vehicle-mounted communication device according to claim 1, wherein
the wireless communication for the vehicle is wireless communication for ITS (Intelligent Transport Systems), and
the general-purpose wireless communication is wireless LAN (Local Area Network) communication.

3. The vehicle-mounted communication device according to claim 1, wherein
a plurality of pairs of the antennas and the wireless units are provided, and
the wireless control unit can perform the general-purpose wireless communication even though the vehicle is parked, and controls each of the wireless units when the vehicle is parked on a road to perform simultaneously the wireless communication for the vehicle and the general-purpose wireless communication with the antenna.

4. The vehicle-mounted communication device according to claim 1, further comprising:
a timer that clocks a elapsed time from a time when the vehicle is parked, wherein
the wireless control unit performs the wireless communication for the vehicle with the antenna at a predetermined period until the elapsed time clocked by the timer reaches a predetermined time.

5. The vehicle-mounted communication device according to claim 4, wherein when a power source of a communication source device outside the device is turned OFF, and thus the wireless control unit cannot obtain transmission data for the wireless communication for the vehicle from the said device, the parking position stored in the storage unit is determined as a current vehicle position, and the wireless communication for the vehicle is performed with the antenna using the said current vehicle position and a current time clocked by the timer as the transmission data.

6. A navigation device, comprising:
an antenna that corresponds to wireless communication for a vehicle using a frequency band dedicated to the vehicle, and general-purpose wireless communication;
a wireless unit that switches a frequency that performs the wireless communication with the antenna between a frequency for the wireless communication for the vehicle, and a frequency for the general-purpose wireless communication;
a parking determination unit that determines whether or not the vehicle is parked, and a parking place thereof;
a storage unit that stores as a parking position a vehicle position at the time when it is determined that the vehicle is parked by the parking determination unit;
a position measurement unit that measures the vehicle position;
a navigation functional unit that performs navigation processing on the basis of an own vehicle position measured by the position measurement unit and map data; and
a wireless control unit that controls the wireless unit to perform the wireless communication for the vehicle with the antenna when the vehicle is running, and continue the wireless communication for the vehicle with the antenna when it is determined that the vehicle is parked on a road by the parking determination unit, and switch to the general-purpose wireless communication when it is determined that the vehicle is parked in a parking lot specified in advance where the general-purpose wireless communication is possible.

7. The navigation device according to claim 6, wherein
the wireless communication for the vehicle is wireless communication for ITS (Intelligent Transport Systems), and
the general-purpose wireless communication is wireless LAN (Local Area Network) communication.

8. The navigation device according to claim 6, wherein
the navigation functional unit collates the parking position stored in the storage unit with the map data to thus discriminate the parking place of the vehicle, and
the parking determination unit determines, from a discrimination result by the navigation functional unit, whether the vehicle is parked on the road or parked in the parking lot specified in advance where the general-purpose wireless communication is possible.

9. The navigation device according to claim 6, further comprising:
a photographing unit that performs image recognition of a white line on the road from an image obtained by photographing a scene outside the vehicle, wherein
the parking determination unit determines that the vehicle is parked on the road when the image recognition of the white line on the road is performed by the photographing unit.

10. The navigation device according to claim 6, further comprising:
a vehicle sensor that detects a running vehicle outside the vehicle, wherein
the parking determination unit determines that the vehicle is parked on the road when a running vehicle on the road is detected by the vehicle sensor.

11. The navigation device according to claim 6, further comprising:
a presentation unit that presents information to an occupant of the vehicle; and
an operation unit that gives to the wireless control unit an instruction to switch to the wireless communication for the vehicle or the general-purpose wireless communication to be performed with the antenna, wherein
the wireless control unit presents warning information to the occupant via the presentation unit when determination is made by the parking determination unit that the vehicle is parked on the road and the instruction to switch to the general-purpose wireless communication is given by the operation unit.

12. The navigation device according to claim 6, wherein, even though the general-purpose wireless communication with the antenna is in the middle, when running of the vehicle is started, the wireless control unit switches to the wireless communication for the vehicle.

* * * * *